No. 690,247. Patented Dec. 31, 1901.
C. S. DOME.
BOX HANDLE.
(Application filed June 5, 1901.)
(No Model.)
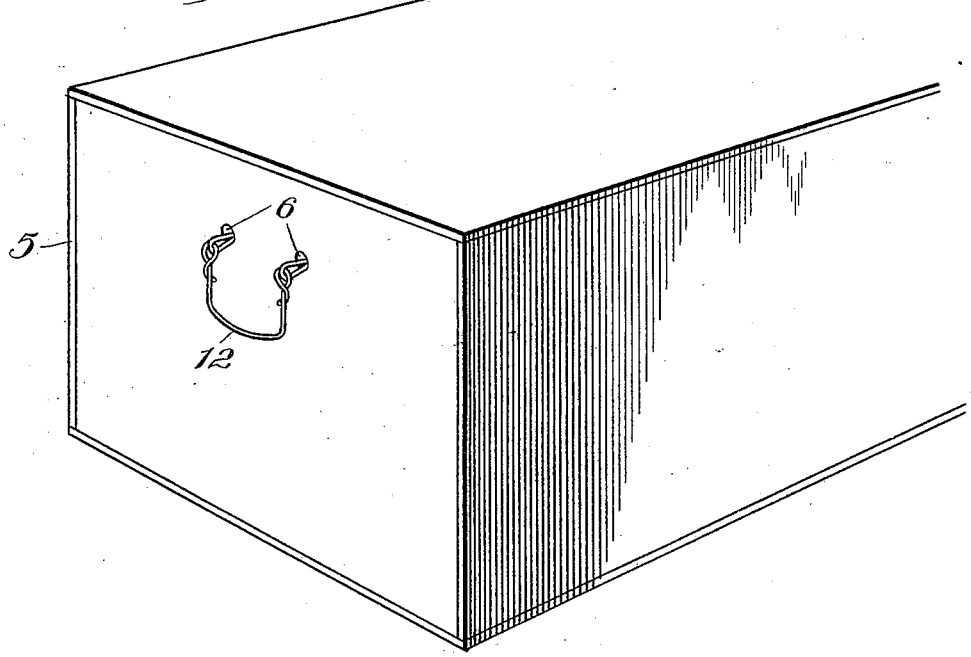
Fig. I.
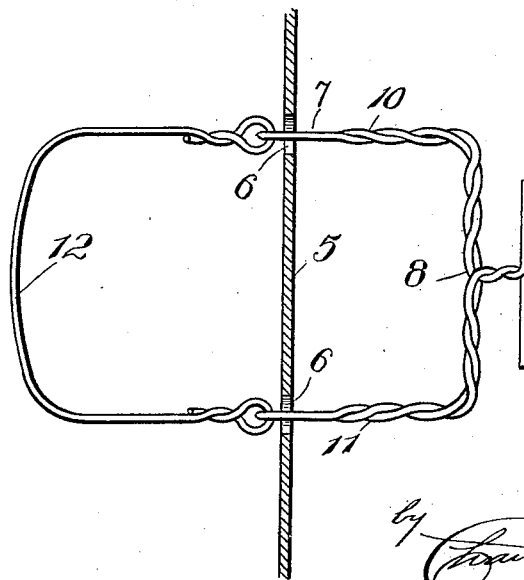
Fig. 2.
Witnesses
T. P. Brett
A. L. Claudee
Inventor
C. S. Dome,
by
Claudee Claudee
Attorneys
THE NORRIS PETERS CO., PHOTO-LITHO., WASHINGTON, D. C.

United States Patent Office.

CORDELIA S. DOME, OF ARENDSVILLE, PENNSYLVANIA.

BOX-HANDLE.

SPECIFICATION forming part of Letters Patent No. 690,247, dated December 31, 1901.

Application filed June 5, 1901. Serial No. 63,265. (No model.)

*To all whom it may concern:*

Be it known that I, CORDELIA S. DOME, a citizen of the United States, residing at Arendsville, in the county of Adams, State of Pennsylvania, have invented certain new and useful Improvements in Box-Handles; and I do hereby declare the following to be a full, clear, and exact description of the invention, such as will enable others skilled in the art to which it appertains to make and use the same.

This invention relates to handles in general, and more particularly to that class used for packing cases; and it has for its object to provide a simple and cheap construction of handle that may be attached to a packing case or box to facilitate handling thereof, a further object of the invention being to provide a construction that may be formed of wire.

Further objects and advantages of the invention will be understood from the following description.

In the drawings forming a portion of this specification and in which like numerals of reference indicate similar parts in the several views, Figure 1 is a perspective view showing one end portion of a box having a handle attached thereto and constructed in accordance with the present invention. Fig. 2 is a horizontal section through the end of the box and showing the complete handle in elevation.

Referring now to the drawings, there is shown a portion of a box 5, and in the ends of the box are formed spaced perforations 6, and through these perforations at each end of the box is engaged one member of the handle. The member 7 of the handle, that is engaged through the openings or perforations 6, consists of a wire, including a central portion 8, at the ends of which the wire is bent in a common plane at right angles to form arms 10 and 11, the wire then being returned at the end of each of the arms and twisted around the arms and around the central portion, the extremities of the wire being then twisted together at the rear side of the central portion. There is thus formed a U-shaped member, the arms of which are passed outwardly through the perforation 6, with the central portion lying against the inner face of the end of the box and the ends of the arms of the member having loops. The second member of the handle consists of a bale 12, formed of a single wire and of U shape, the ends of the bale being engaged through the loops of the first member and then bent backwardly and twisted upon themselves, so that the two members are securely and pivotally connected. With this construction in the shipment of a box the inner member may be drawn inwardly and the outer member may be permitted to lie flat against the end of the box, and when the box is to be moved the handles may be drawn out to their fullest extent, so that they may be grasped to facilitate carrying of the box.

It will be understood that in practice modifications of the specific construction shown may be made without departing from the spirit of the invention.

What is claimed is—

1. The combination with a box having spaced perforations, of a handle comprising a U-shaped member having its arms passed outwardly through the perforations and provided with loops at their outer ends, the arms being slidable in the perforations to permit of movement of them into and out of the box, and a bale having loops at its ends pivotally engaged with the loops of the first member.

2. The combination with a box having spaced perforations, of a handle comprising an inner and an outer U-shaped member, the inner member consisting of a single wire bent into U shape and having its end portions returned upon and twisted about the arms and the central portion thereof and having their extremities twisted together, the sides or arms of the member being passed outwardly through the perforations of the box and adapted for sliding movement into and out of the box and having terminal loops, and the second member consisting of a single wire having its ends passed through the loops of the first member and then bent backwardly and twisted upon themselves to form a hinged connection between the members.

In testimony whereof I affix my signature in presence of two witnesses.

CORDELIA S. DOME.

Witnesses:
CHAS. E. DOME,
ANNIE F. DOME.